United States Patent

[11] 3,597,947

[72] Inventor Joseph Solow
Box 116, Plainview, N.Y. 11803
[21] Appl. No. 837,659
[22] Filed June 30, 1969
[45] Patented Aug. 10, 1971

[54] AUTOMOBILE HOOD-LOCKING DEVICE
3 Claims, 4 Drawing Figs.
[52] U.S. Cl............................................. 70/240, 70/93
[51] Int. Cl...................................... E05b 65/19, E05c 17/36
[50] Field of Search......................................... 70/93, 240, 15, 18; 292/264

[56] References Cited
UNITED STATES PATENTS
1,774,351 8/1930 Brand........................... 292/264
2,631,877 3/1953 Ainsworth.................... 292/264 X
2,966,053 12/1960 Mintz............................ 70/93
3,315,502 4/1967 Skrapits et al. ............... 70/240

Primary Examiner—Albert G. Craig, Jr.
Attorney—Polachek & Saulsbury

ABSTRACT: An automobile hood-or trunk-locking device formed of disengaging parts and so fashioned that the parts can be readily secured between the underside of a hood and frame parts of the automobile thereunder for any different type of vehicle which includes a chain with a lock barrel attached to the hood and frame parts by the simple drilling of undersize holes therein, and securing the attaching parts thereto by means of thread-cutting screws. One of the attaching parts being of cylindrical shape adapted to slidably receive a lock barrel and a chain link and secured to the cylinder by a key-operating latch, making necessary the use of the owner's key to disengage the lock barrel and the chain from the attached parts to allow the hood to be raised its full extent.

Patented Aug. 10, 1971
3,597,947
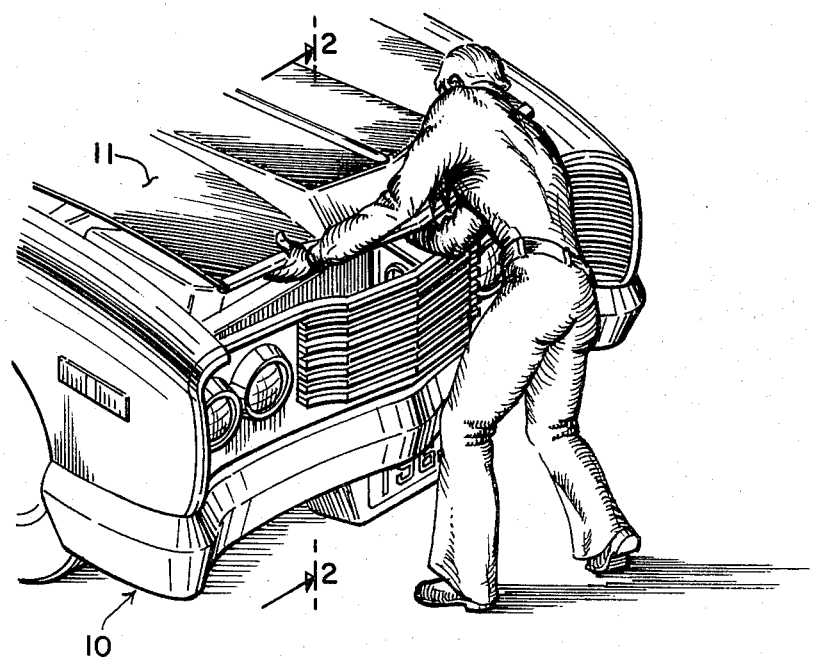
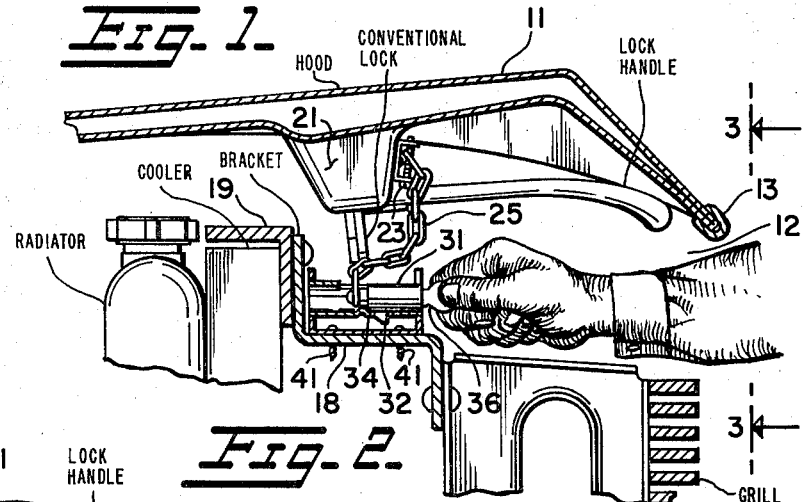
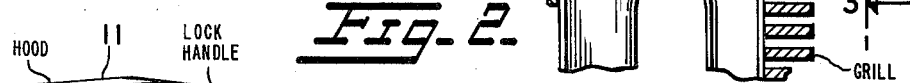
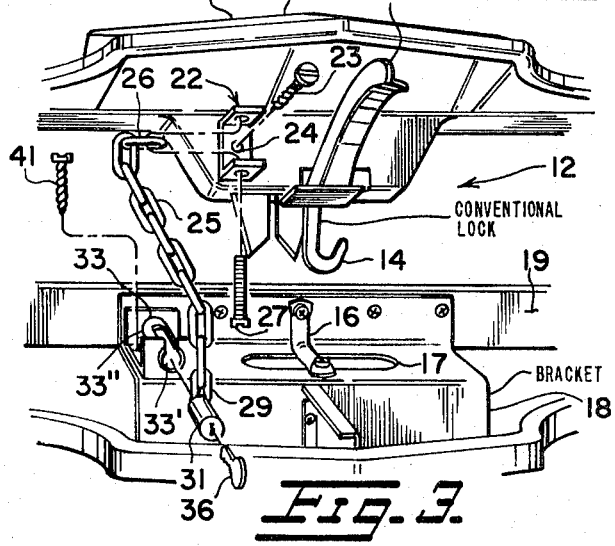
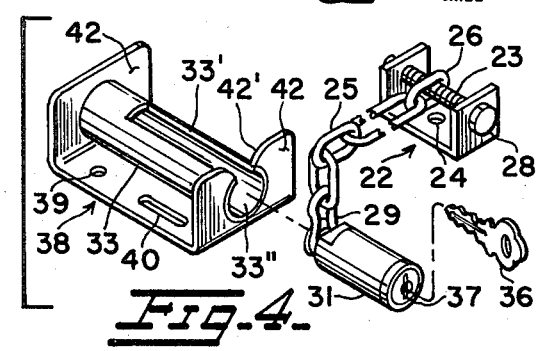
INVENTOR.
JOSEPH SOLOW
BY
*Polachek & Saulsbury*
ATTORNEYS 3,597,947

AUTOMOBILE HOOD-LOCKING DEVICE

This invention relates to an automobile hood-locking device adapted to be easily installed between the hood and the frame parts thereunder.

It is the principal object of the present invention to provide a hood lock formed of two parts which can be easily installed on the underside of the hood and to a frame part thereunder which will allow for limited opening of the hood suitable to permit the hand to be inserted to unlatch the lock and to provide for the separation of the parts so that the hood can be elevated to the full open position.

It is another object of the invention to provide an automobile hood-locking device that is so constructed and so adapted that its part can be connected to the hood of any make automobile and to the frame parts of the automobile thereover by simple drilling operations and the use of thread-cutting screws for securing the parts yet providing for such limited motion between the parts that the parts can be unlocked from one another yet provide for any length chain for adaptation of lock device between any different height between the hood and the frame parts, whereupon the locking device is adapted to substantially any make of automobile and even for use on any of the trunk covers where frame parts are available for the attachment of the separable parts of the locking device thereto and within the length of the chain provided with the lock device.

It is another object of the invention to provide an automobile hood-locking device wherein the cylindrical metal barrel keylock can be used with a chain fitted to the same and yet be adapted to be extended into a cylindrical sleeve along with the chain without interference therefrom and wherein both the cylindrical lock and chain will be held secured therewithin with the end chain link fitted to the cylindrical barrel and extendable into the tubular socket so as to be engageable with the inner side thereof and so that force can be placed upon the cylindrical sleeve with both the cylinder and end chain link.

Other objects of the invention taken along with the above objects, are to provide a hood-locking device which can be easily installed upon the vehicle, of sturdy construction, useable with a key, provided independently of the hook lock and without attachment thereto, which will permit use of the conventional lock but provide additional locking for the hood requiring the need for a key in order to finally lift the hood to the full position yet for purposes of checking the depth of water in the water radiator allow for inspection without fully lifting the hood, efficient and effective in use.

For a better understanding of the invention, reference may be had to the following detailed description taken in connection with the accompanying drawing in which FIG. 1 is a perspective view of an automobile and man having lifted the hood to make insertion of the key into the locking device.

FIG. 2 is a fragmentary sectional view taken on line 2—2 of FIG. 1 and showing the frame parts thereof beneath the hood as well as the conventional hood latch and with the hand of the owner unlocking with his key the device.

FIG. 3 is a fragmentary front perspective view looking under the hood with illustration being made to show how the parts of the lock device are attached into under parts of the hood.

FIG. 4 is a collective perspective view of the locking device part disassembled from one another and free of its connection with the automobile frame parts.

Referring now to the figures, 10 generally represents the nose of an automobile having a hood 11 adapted to be hinged upwardly from its front to provide access to engine space 12 under the hood. This hood has a forward edge 13 and on the underside is a conventional lock device which is normally released by the fingers of the operator as lift is provided at the forward edge 13 of the hood 11. This conventional lock at its engaging end may take the form of a hook 1 14 engageable under a strip 16 overlying and across an elongated slot 17 in a bracket part 18 providing the front grille and a laterally extending angle-shaped piece 19 overlying the automobile cooler and radiator.

The hood 11 has depending material 21 supporting the conventional lock and upon which a present locking device can have one of its parts attached. By drilling undersize holes in the forward face of the depending material 21 that supports the conventional lock, a U-shaped lock piece 22 is fixed by a thread-cutting screw 23 extended through a hole 24 in the bight of the U-shaped lock piece 22. With this engagement being made, fixed and permanent, a link chain 25 can be connected by its end link 26 to the U-shaped lock piece 22 by a pivot bolt 27 extending through the link and threaded within holes of link portions of the lock piece 24 and thereafter as seen in FIG. 4 the head of the screwbolt filed to rid the head 28 of the slot so that the chain link cannot be readily removed with a screwdriver acting upon the screwbolt 23.

Other end link 29 of the chain 25 is fixed to a cylindrical lock barrel 31 and transversely squeezed about a reduced-diameter end thereof as best shown in FIG. 4. The link 29 itself is narrowed between its end portions so that it can be accommodated into an open end slot 33' of a cylindrical sleeve 33 adapted to receive the cylindrical barrel 31 so that the chain link with an effective pull on the same would be itself connected between edges of the slot 33' so as not to put great pull on the end of the cylindrical barrel 31. The cylindrical barrel 31 has a lock latch 31 engageable in a bottom slot 34 of the slotted sleeve 33 which receives the chain and the lock barrel 31 through its open end 33''. The latch 32 is controlled by a key 36 that enters a keyhole 37 on the free end of the lock barrel 31.

The cylindrical sleeve 33 is rigidly carried in another U-shaped member 38 having holes 39 and 40 for securement to the top face of the bracket 18 by thread-cutting screws 41 inserted after small-size holes have been drilled into the top of the bracket 18. The U-shaped member 38 has upstanding front and rear leg portions 42 and 43 in which the ends of the sleeve 33 are mounted and welded for rigid securement therewith. The front leg portion 42 is cut away at its as indicated at 42' to accommodate the chain link 29 as the lock barrel 31 is slid into the slotted sleeve 33 and yet provide such rigidity to prevent the lifting of the lock barrel 31 through the slot by a pull upon the chain 25. With both members 22 and 38 respectively secured to the hood and under bracket 18 and the chain 25 and lock barrel 31 inserted in the sleeve 33 disengagement of the hood from the under part thereof is not made possible without inserting the key 36 in the barrel and removing the same with the chain therefrom. The key is inserted by first disengaging the conventional lock with the bracket 18, lifting the same to such extent as illustrated in FIGS. 1 and 2 so that the hand can be extended under the front edge 13 of the hood and into space 12 to thrust the key 36 into the key opening 37 of the lock barrel. Unless one has the key 36, the hood 11 cannot be extended above the position controlled by the length of the chain links 25.

This hindrance to opening of the hood will prevent others from entering the space 12 thereunder, to work upon the engine, or the purpose of theft of the automobile or any removal of any of its parts.

All of the parts are made rugged and rigid and secured on the chain links 25 that limit the lifting of the parts together.

What I claim is:

1. An automobile hood lock device comprising a link chain, a lock barrel secured to one end of the chain, a cylindrical sleeve adapted to slidably receive one link end of the chain and the lock barrel and having a slot for receiving the lock barrel latch, the lock barrel having a key opening for receiving the key to release the lock barrel and chain from the cylindrical sleeve means for permanently securing the other end of the chain to the automobile hood, and means for securing the lock barrel sleeve to a frame part, said cylindrical sleeve having an open-ended slot for receiving a chain link as the lock barrel is inserted into the sleeve through the open end of the slot, said lock barrel having a reduced diameter projection on its inner end, the one of said links being squeezed transversely about the reduced diameter projection, the width of said open-ended slot being less than the width of the link at its connection upon the lock barrel but such as to accommodate the squeezed portions of the link.

2. An automobile hood lock device as defined in claim 1, and said means for securing the link chain to the hood part including a U-shaped member having upstanding legs secured by its bight to the hood part and a screwbolt extending through the leg portions and a link of the link chain.

3. An automobile hood lock device as defined in claim 1, and said means for securing the slotted cylindrical barrel-receiving sleeve to a frame part comprising a U-shaped member having a bright serving for flush engagement of the member to the frame part and upstanding leg portions, said cylindrical sleeve being rigidly retained by its ends in the upstanding leg portions and one of the upstanding portions being cut away from the sleeve slot to accommodate the passage of the chain link into and along the cylindrical sleeve slot.